US012560682B2

(12) United States Patent
    Lore

(10) Patent No.:  US 12,560,682 B2
(45) Date of Patent:      Feb. 24, 2026

(54) RADAR TRANSCEIVER TEST

(71) Applicant: VEONEER SWEDEN AB, Vargarda (SE)

(72) Inventor: Pascal Lore, Yokohama (JP)

(73) Assignee: MAGNA ELECTRONICS SWEDEN AB, Vårgårda (SE)

( * ) Notice: Subject to any disclaimer, the term of this patent is extended or adjusted under 35 U.S.C. 154(b) by 755 days.

(21) Appl. No.: 17/995,417

(22) PCT Filed: Apr. 28, 2020

(86) PCT No.: PCT/EP2020/061772
    § 371 (c)(1),
    (2) Date: Oct. 4, 2022

(87) PCT Pub. No.: WO2021/219206
    PCT Pub. Date: Nov. 4, 2021

(65) Prior Publication Data
    US 2023/0147649 A1      May 11, 2023

(51) Int. Cl.
    *G01S 7/40*        (2006.01)
    *G01S 13/931*      (2020.01)
(52) U.S. Cl.
    CPC .......... *G01S 7/4052* (2013.01); *G01S 7/4021* (2013.01); *G01S 7/4026* (2013.01); *G01S 13/931* (2013.01); *G01S 2013/93275* (2020.01)
(58) Field of Classification Search
    CPC ......... G01S 13/931; G01S 2013/93275; G01S 7/4008; G01S 7/4013; G01S 7/4021;
    (Continued)

(56) References Cited

U.S. PATENT DOCUMENTS 5,896,103 A * 4/1999 Bunch ................... G01S 7/2927
                                                  342/174
5,959,570 A * 9/1999 Russell ................. G01S 7/4004
                                                  700/301
(Continued)

FOREIGN PATENT DOCUMENTS

CN        109557546 A      4/2019
CN        110709907 A      1/2020
          (Continued)

OTHER PUBLICATIONS

Internatonal Search Report and Written Opinion of PCT/EP2020/061772, mailed Jan. 11, 2021.
(Continued)

*Primary Examiner* — Peter M Bythrow
(74) *Attorney, Agent, or Firm* — DICKINSON WRIGHT PLLC

(57)                ABSTRACT

A radar system (2) for a vehicle (1), having a radar transceiver (3) and a control unit (4), where the control unit (4) is adapted to control the radar transceiver to apply an initial signal power level (P$_i$) for transmitted radar signals (5); and to receive reflected radar signals (6) that have been reflected by at least one object (7). The control unit (4) is further adapted to determine a total signal reduction level (L) for which at least one predetermined criterion is not met; to compare the total signal reduction level (L) to a threshold; and to determine whether the radar transceiver (3) is working in an acceptable manner or not in dependence of the comparison.

7 Claims, 9 Drawing Sheets

(58) Field of Classification Search
CPC ...... G01S 7/4026; G01S 7/403; G01S 7/4052;
G01S 7/4086
See application file for complete search history.

(56) References Cited

U.S. PATENT DOCUMENTS

| | | | | |
|---|---|---|---|---|
| 6,469,659 | B1 * | 10/2002 | Lajiness | G01S 7/4004 |
| | | | | 342/91 |
| 6,933,883 | B2 * | 8/2005 | Isaji | G01S 7/4026 |
| | | | | 342/75 |
| 9,063,213 | B2 * | 6/2015 | Himmelstoss | G01S 13/931 |
| 11,054,501 | B2 * | 7/2021 | Steinbuch | G01S 13/42 |
| 11,327,162 | B1 * | 5/2022 | Grabe | G01S 7/4095 |
| 12,013,478 | B2 * | 6/2024 | Li | G01S 7/006 |
| 2007/0120731 | A1 * | 5/2007 | Kelly | G01S 7/021 |
| | | | | 342/159 |
| 2009/0102700 | A1 * | 4/2009 | Kato | G01S 7/4008 |
| | | | | 342/173 |
| 2013/0271310 | A1 * | 10/2013 | Izumi | G01S 7/4008 |
| | | | | 342/368 |
| 2017/0285165 | A1 * | 10/2017 | Khlifi | G01S 13/931 |
| 2017/0336496 | A1 * | 11/2017 | Fujii | G01S 13/04 |
| 2017/0350970 | A1 * | 12/2017 | Saito | G01S 13/42 |
| 2018/0024238 | A1 * | 1/2018 | Khlifi | G01S 13/931 |
| | | | | 342/52 |
| 2018/0143298 | A1 * | 5/2018 | Newman | G02B 27/0006 |
| 2019/0077458 | A1 * | 3/2019 | Khlifi | B62D 15/025 |
| 2019/0094338 | A1 * | 3/2019 | Fischer | G01S 13/003 |
| 2022/0404455 | A1 * | 12/2022 | Liu | G01S 13/931 |

FOREIGN PATENT DOCUMENTS

| | | | |
|---|---|---|---|
| DE | 10 2016 001310 A1 | 8/2017 | |
| DE | 102017211816 A1 | 1/2019 | |
| EP | 3299839 A1 | 3/2018 | |

OTHER PUBLICATIONS

Office Action regarding corresponding CN App. No. 202080100241.
7; dated Apr. 30, 2025.
Office Action regarding corresponding EP App. No. 20 722 566.5;
issued Jan. 22, 2025.

* cited by examiner

RADAR TRANSCEIVER TEST

CROSS-REFERENCE TO RELATED APPLICATIONS

This application is a 35 U.S.C. § 371 national phase of PCT International Application No. PCT/EP2020/061772, filed Apr. 28, 2020, the contents of which are incorporated herein by reference in their entirety.

FIELD OF THE INVENTION

The present disclosure relates to radar systems adapted for automotive applications. There are disclosed radar systems and methods for testing function characteristics of radar transceivers.

BACKGROUND

A radar transceiver is, normally, a device arranged for transmission and reception of radar signals in a dedicated radar frequency band. Radar transceivers are commonly used in vehicles for monitoring vehicle surroundings. Automatic Cruise Control (ACC) functions, Emergency Braking (EB) functions, Advanced Driver Assistance Systems (ADAS) and Autonomous Drive (AD) are some examples of applications where radar data represents an important source of information on which vehicle control is based.

Radar transceivers are positioned at various positions, some are positioned behind a vehicle bumper that serves as a secondary radome. For these, there can be a need to be able to evaluate for potential radar signal blockage. Typical cases for blockage are blockage by an object such as snow or other deposit on the bumper while the vehicle is parked, and when the bumper in front of the radar transceiver needs to be repaired and new paint has to be applied.

In the latter case, it is difficult to control the paint characteristics of the re-painted bumper. The paint has to be matched to the rest of the paint and thus a mix of various elements is often needed to achieve the same color. The characteristics of the new paint may differ from the characteristics of the original paint, and how the paint is applied can both affect the original radar transceiver performance in term of detection range and azimuth angle estimation accuracy. Excess paint will result in reduced range of radar, sometimes in the form of narrow notches caused by cancellation of the signal from the reflections between the radar and fascia.

There is thus a need to check if, and to which degree, the new paint affects the range and azimuth angle estimation performance. Such a method can be implemented inside the radar to detect such impact by collecting data while the vehicle is running. However, driving the vehicle at the repair shop is not always possible.

There also exist static methods, for example measurement of the thickness using ultrasonic probe. A problem with this approach is that the performance does not only depend on the thickness, but also on the painted material. Depending on the radar transceiver, it is not always possible to define a pass/fail criteria.

Another example of a static method is measurement of a radiated wave using receiver equipment. This is relatively precise, but requires appropriate equipment to be able to measure an RF signal. Such equipment is expensive and cannot be deployed in all service shops.

There is thus a need for further improvements, in particular to check if, and to which extent, radar transceiver characteristics have changed for a re-painted bumper. Such a control should be possible to perform without moving the vehicle, and by using low-cost equipment. Generally, there is a need for improved testing of the functionality of radar transceivers, in particular after a known change has been made to the transceiver itself or its surroundings, such as for example the mentioned re-painting.

SUMMARY DESCRIPTION OF EXAMPLE EMBODIMENTS OF THE INVENTION

It is an object of embodiments of the present disclosure to provide a radar system and a method for controlling if, and to which extent, radar transceiver function characteristics have changed for a radar transceiver, for example due to a re-painted bumper.

This object is obtained by radar system for a vehicle, comprising a radar transceiver and a control unit. The control unit is adapted to control the radar transceiver to apply an initial signal power level for transmitted radar signals, and to receive reflected radar signals that have been reflected by at least one object. The control unit is further adapted to determine a total signal reduction level for which at least one predetermined criterion is not met, to compare the total signal reduction level to a threshold, and to determine whether the radar transceiver is working in an acceptable manner or not in dependence of the comparison.

This means that it is possible to control if, and to which degree, radar transceiver function characteristics have changed for a radar transceiver without the need to drive a vehicle to which the radar transceiver is mounted. No special radar target is needed, a low cost target such as a corner reflector, or no target at all, can be sufficient.

According to some aspects, the predetermined criterion relates to at least one of received signal quality and/or the number of detections corresponding to the received signal.

According to some aspects of embodiments of the present invention, the control unit is adapted to repeatedly control the radar transceiver to apply a step-wise reduction of signal power level until the total signal reduction level for which at least one predetermined criterion is not met is obtained.

According to some aspects of embodiments of the present invention, the control unit is adapted to either step-wise reduce or step-wise increase the signal power level in dependence of a previous signal power level change or half a maximum possible signal power level reduction, until the total signal reduction level for which at least one predetermined criterion is not met is obtained.

This means the search for a threshold can be performed in many ways, for example by lowering the signal step by step or using a binary search algorithm. Choosing a suitable search algorithm can for example be directed towards decreasing the total time needed for the test.

According to some aspects of embodiments of the present invention, at least one object is a predefined target object associated with predefined target position data.

According to some aspects of embodiments of the present invention, there is a plurality of predefined target objects positioned at different azimuth angles within a field of view (FOV) of the radar transceiver.

This means that one or more predefined targets can be used, where the targets can be constituted by low cost targets such as corner reflectors.

According to some aspects of embodiments of the present invention, at least one object is an undefined target object in the environment.

This means that at least one target does not need to be a predefined object, lowering cost and complexity.

According to some aspects, several angular zones are provided in azimuth such that separate information regarding the different zones can be obtained.

There are also disclosed herein vehicles and methods associated with the above-mentioned advantages.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. Further features of, and advantages with, the present disclosure will become apparent when studying the appended claims and the following description. The skilled person realizes that different features of the present disclosure may be combined to create embodiments other than those described in the following, without departing from the scope of the present disclosure.

BRIEF DESCRIPTION OF THE DRAWINGS

Embodiments of the present disclosure will now be described in more detail with reference to the appended drawings, where FIG. 1 schematically shows a top view of a vehicle according to a first example.

DETAILED DESCRIPTION

Figure 1:
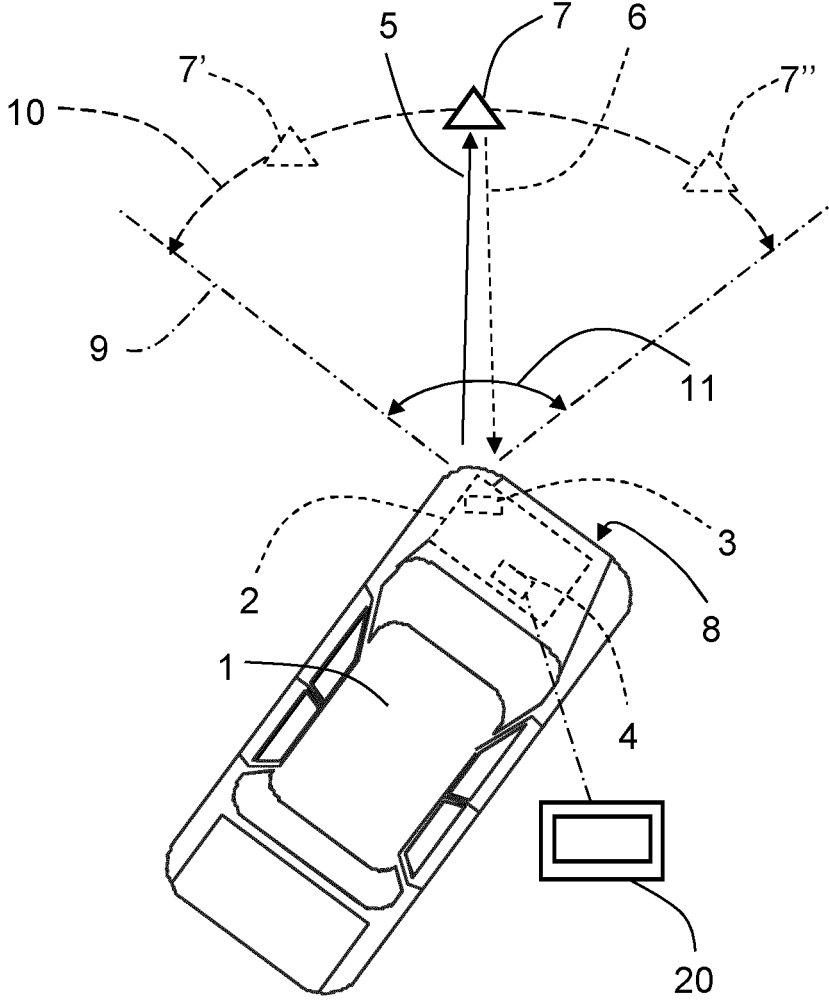

Aspects of the present disclosure will now be described more fully with reference to the accompanying drawings. The different devices and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the disclosure. As used herein, the singular forms "a", "an" and "the" are intended to include the plural forms as well, unless the context clearly indicates otherwise.

FIG. 1 shows a top view of a vehicle 1 that comprises a radar system 2 that in turn comprises a radar transceiver 3 and a control unit 4. The radar transceiver 3 has a certain field of view (FOV) 9 and is here in the form of a corner radar transceiver 3.

The radar transceiver 3 is adapted to transmit radar signals 5 and receive reflected radar signals 6 that have been reflected by an object 7. The control unit 4 controls the radar transceiver 3, for example transmission timing, transmission frequency content, as well as the actual transmitted time waveform. The control unit 4 is also adapted to perform signal processing in order to extract target data related to the detected objects, for example FFT:s for obtaining a Range-Doppler matrix in a previously well-known manner.

Figure 2A:
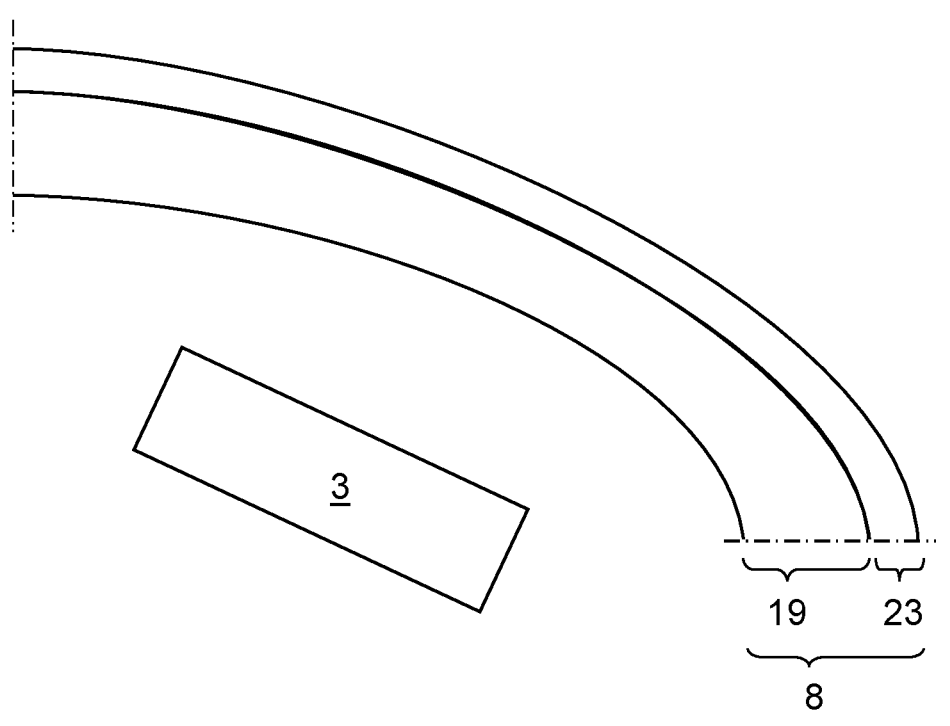
FIG. 2A schematically shows a radar transceiver and a part of a bumper.

The radar transceiver 3 is positioned behind or inside a bumper 8 which therefore behaves as an outer radome for the radar transceiver 3. This is also illustrated in FIG. 2A, where the radar transceiver 3 is shown poisoned between the bumper 8, where the bumper 8 comprises a base material layer 19 and an outer paint layer 23.

Figure 2B:
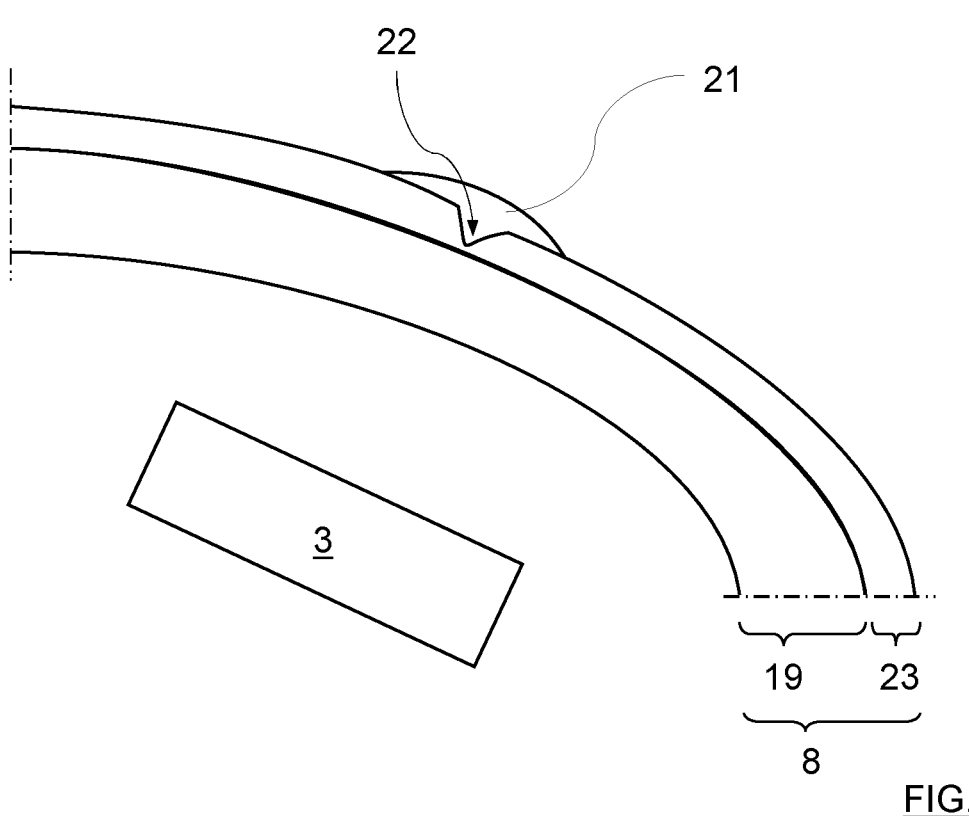
FIG. 2B schematically shows a radar transceiver and a part of a bumper that has been partially re-painted.

In the following it will be described how function characteristics of the radar transceiver 3 can be tested, for example due to that a known change has been made to the radar transceiver 3 itself or its surroundings, such as for example re-painting of the bumper 8. Such a re-painting is illustrated in FIG. 2B where there is a paint scratch portion 21 that has damaged the paint layer 23 and has been covered by a re-paint portion 22.

According to the present disclosure, the control unit 4 is adapted to control the radar transceiver 3 to apply a certain initial signal power level $P_i$ and to collect and store target data obtained from the reflected radar signals 6 that have been reflected by an object 7. The control unit 4 is further adapted to compare the stored target data to certain predetermined criteria.

If the predetermined criteria are met, the control unit 4 is adapted to control the radar transceiver 4 to apply a first reduced signal power level $P_{r1}$ and again collect and store target data in the same way as for the initial signal power level $P_i$. The control unit 4 is again adapted to compare the stored target data to certain predetermined criteria. This procedure is repeated until the predetermined criteria are not met, then the control unit 4 is adapted to compare a total signal reduction level L to a threshold. Depending on the result of the comparison, it is determined if the result is acceptable or not, for example if the bumper repaint 21 is acceptable or not.

The total signal reduction level L is the difference between the initial signal power level $P_i$ and a present reduced signal power level $P_m$ where n is the number of power reductions having been performed.

According to a first example, a known target object 7 such as a corner reflector or other reflecting item is used. The target object 7 is positioned at a known position and the control unit 4 is set in a test mode that performs the above steps. Any low cost target object can be used, and a basic self-test routine may be used at the control unit 4. This test can be performed by means of the same equipment/setup as existing mounting angle checks.

Figure 3:
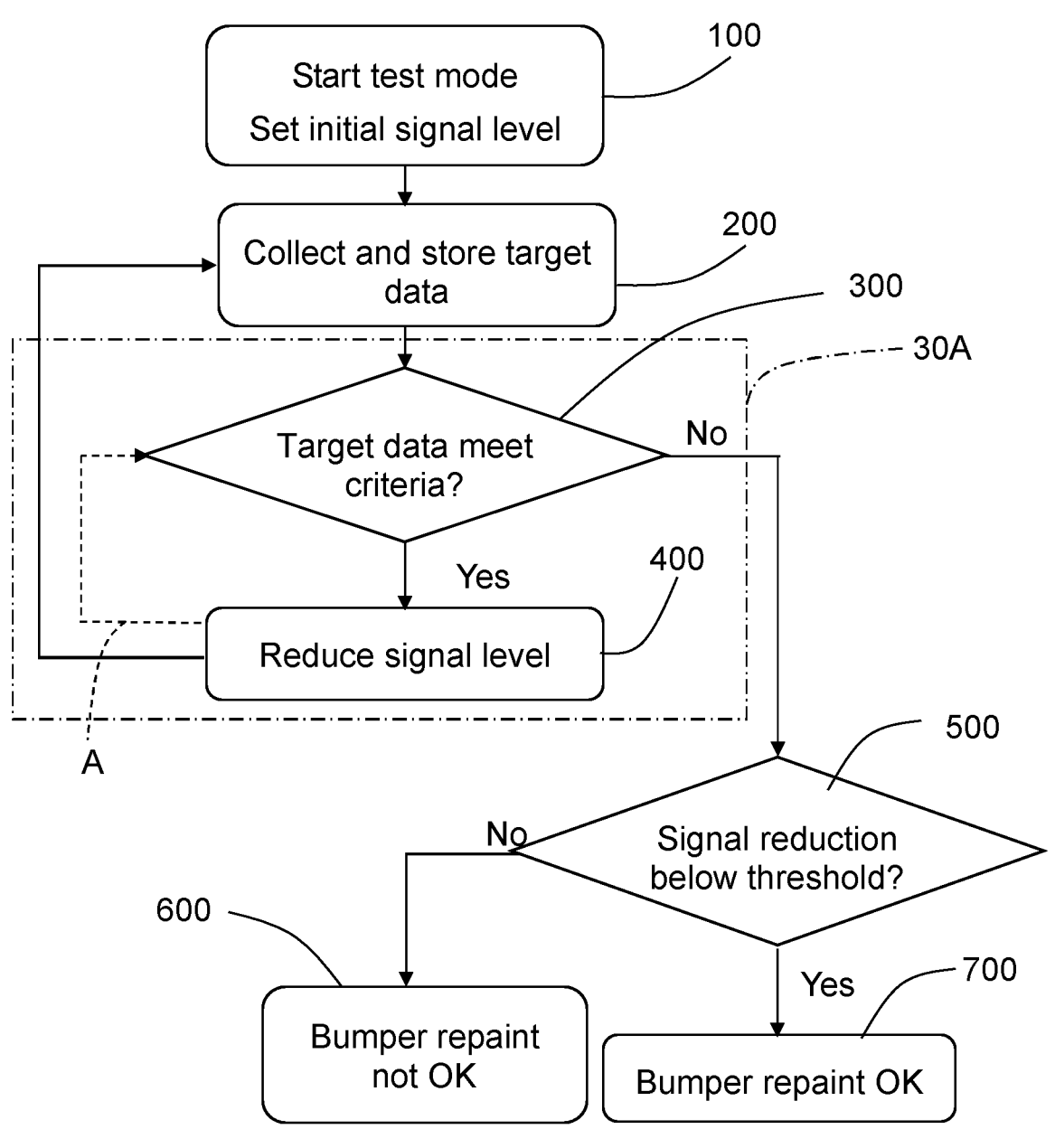
FIG. 3 is a flow chart illustrating methods according to the first example.

More in detail, with reference also to FIG. 3 that illustrates a flowchart, the first example can be described according to seven basic method steps as outlined below, which steps according to some aspects of the present invention are controlled by the control unit.

In a first step 100, a test mode is started, and target position data are received from an external console 20 such as an external computing device, for example a personal computer (PC), or by using internally preset values. The test mode can also be setup and run from the external console 20.

For example the target position data are given as parameters such as X/Y coordinates or range/angle values. Unwanted radar detections are filtered in any well-known manner. An initial signal power level $P_i$ is set.

In a second step 200, radar detections are collected and stored for a predetermined number N of radar cycles. According to some aspects of embodiments the present invention, N=100.

In a third step 300, the data stored in the second step 200 are compared with certain predetermined criteria, according to some aspects of embodiments the present invention by means of one of, or a combination of, the following:

Check the number of radar cycles where the target is present. For example 65 times out of N=100 results in 65%, this ratio is compared to a first design threshold $T_{D1}$.

Check the signal to noise ratio (SNR) or signal amplitude of the reflected radar signals 6 that have been reflected by the target object 7 directly. For example, if the received signal amplitude is determined to be low or unstable, compare it to a second design threshold $T_{D2}$.

In a fourth step 400, the signal power level is reduced and the method repeated from the second step 200 until stored target data do not meet certain predetermined criteria according to the third step, according to some aspects of embodiments the present invention, corresponding to that the target no longer is distinguishable.

According to some aspects of embodiments of the present invention, signal level reduction can be done by one or a combination of the following:

Reduction of transmit power.

Reduction of receive gain.

Reduction of fast Fourier transform (FFT) bits or analog to digital converter (ADC) bit shift.

Use a digital variable gain.

Any other method to change the transmitted or received signal.

According to some aspects of embodiments of the present invention, the radar transceiver 3 comprises Monolithic Microwave Integrated Circuit (MMIC) technology, where the reduction of transmit power and/or receive gain is performed by controlling the relevant MMIC.

The cumulated amount of signal power level reduction from the initial signal power level $P_i$, a total signal power level reduction L, is stored.

In a fifth step 500, the total signal power level reduction L at which the stored target data do not meet the certain predetermined criteria according to the third step 300, is compared to a first level threshold $T_{L1}$. The first level threshold $T_{L1}$ can for example be a fixed value, determined based on design and validation.

In a sixth step 600, if the total signal power level reduction L falls below the first level threshold $T_{L1}$, it is determined that the result is not acceptable, for example the bumper repaint is not acceptable.

In a seventh step 700, if the total signal power level reduction L exceeds the first level threshold $T_{L1}$, it is determined that the result is acceptable, for example the bumper repaint is acceptable.

If the total signal power level reduction L equals the first level threshold $T_{L1}$, this could either be communicated separately, or any one of the sixth step 600 or seventh step 700 be taken.

According to some aspects of embodiments of the present invention, a commonly used single Corner Reflector (CR) is used, and can be used to check one part of the bumper 8.

According to some aspects of embodiments of the present invention, several CR:s 7, 7', 7" are used as target objects at different angles. By means of the different target object positions, the attenuation can be checked at different azimuth angles within the FOV 9.

According to some aspects of embodiments of the present invention, a target object does not have to be in the form of a CR, but can be a predetermined single reflective object or plural reflective objects of any suitable kind such as one or more metal posts, rods or metal plates.

According to some aspects of embodiments of the present invention, a target such as a CR or a metal rod can be moved at a fixed range 10 within the FOV 9. The detection rate or SNR for different azimuth angles within an available azimuth angular span 11 could be checked. When there is too much attenuation at some angles, there would be nulls or dips in resulting target data. In this manner, a plurality of angles within the angular span 11 can be checked.

According to some aspects of embodiments of the present invention, the fifth step 500 can be used as a calibration procedure at a factory or during dealer checks. Here, the first level threshold $T_{L1}$ can be set by design, or be derived from a calibration value. For example:

The test is performed before shipping the vehicle 1. This test can also be performed at each check at a dealer. This would help to keep track of degradation due to aging.

The required results of the third step 300 and the total signal power level reduction L can be saved as reference.

When repair paint is tested, the resulting values can be used for comparison to provide bumper attenuation as a radome.

The bumper attenuation can be compared to a fixed attenuation threshold $T_A$.

Depending on the method used for signal level reduction in the fourth step 400, it might not be necessary to perform the second step 200 again.

If, for example, transmit power or receiver gain is changed, then the basic data are changed making the second step necessary.

If digital gain is used in the signal processing, the collected analog data are converted to digital data which are stored. When reprocessing the stored data, there is no need to get new digital data. This is indicated with a dashed arrow A in FIG. 3.

If the second step 200 is deemed necessary or not is of course depends on the definition of the second step, and it can easily be appreciated by a skilled person within the present technical field that such variation is possible.

Figure 4:
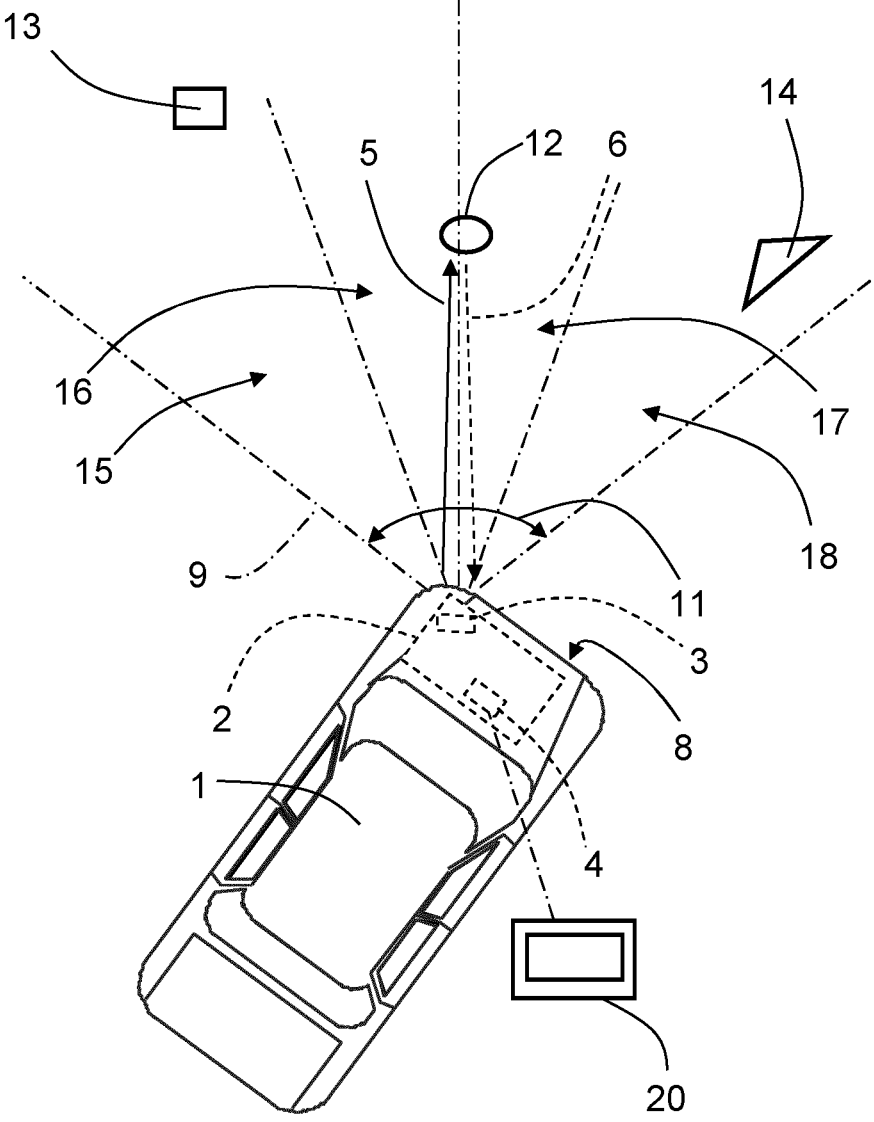
FIG. 4 schematically shows a top view of a vehicle according to a second example.

According to a second example, with reference to FIG. 4 that corresponds to FIG. 1, no known, well-defined, target object is used. The control unit 400 is set in a test mode and adapted to collect and store target data from radar detections from different target objects 12, 13, 14 in the environment, using a certain initial signal power level $P_i$. If a number D of radar detections for one or more detected target objects 12, 13, 14 exceeds a detection number threshold $T_n$, the signal power level is reduced and target data from radar detections are again collected and stored. This is repeated until the number of detected targets falls below the detection number threshold $T_D$. Then the total signal reduction level L required is compared to a second level threshold $T_{L2}$.

Figure 5:
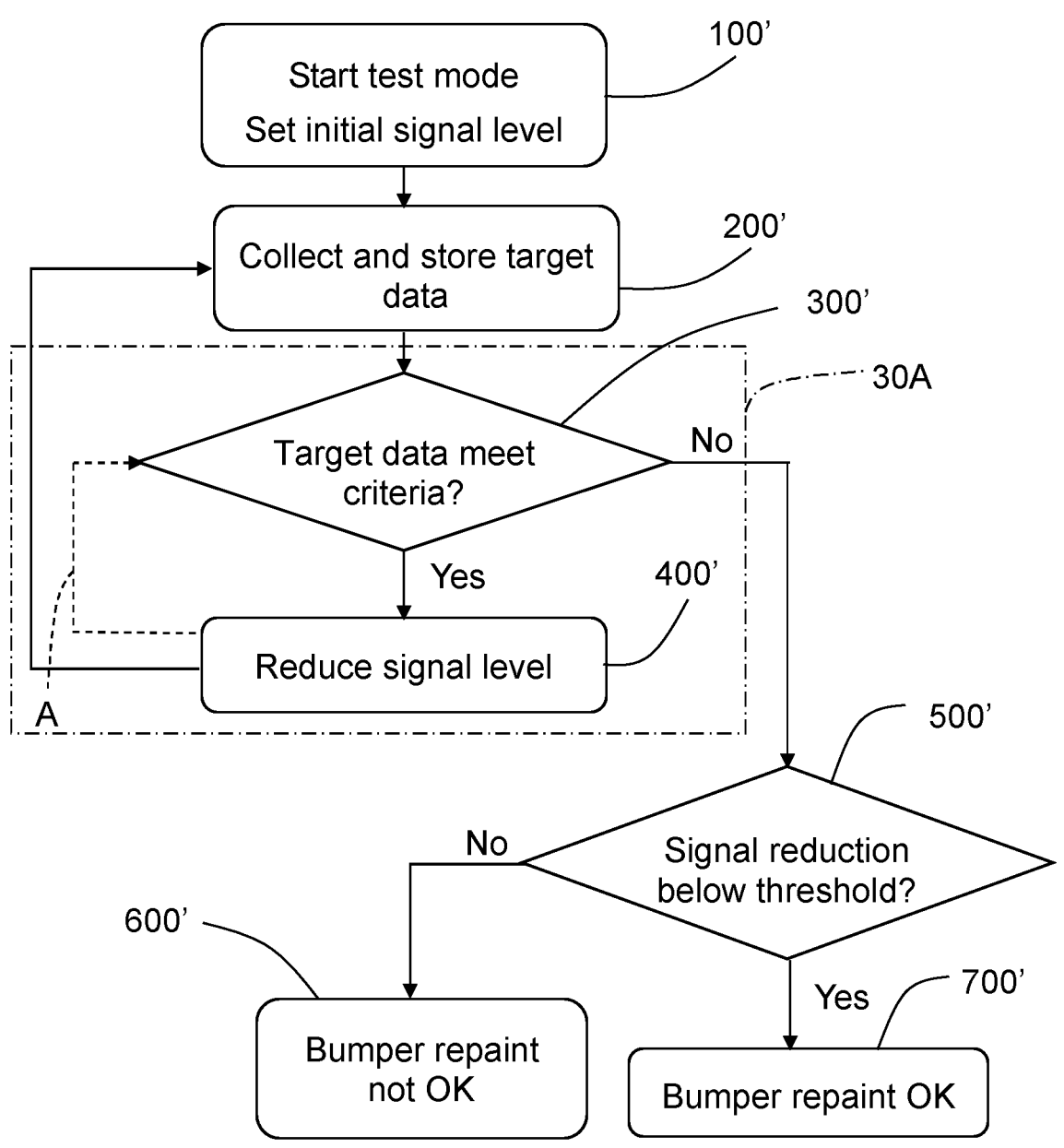
FIG. 5 is a flow chart illustrating methods according to the second example.

More in detail, with reference also to FIG. 5, the second example can be described according to seven basic method steps as outlined below, which steps according to some aspects of the embodiments of the present invention, are controlled by the control unit 4.

In a first step 100', a test mode is started and an initial signal power level is set.

In a second step 200', a predetermined number of radar detections from one or more different target objects 12, 13, 14 are collected and stored for a predetermined number N≥1 of radar cycles.

In a third step 300', the detection data stored in the second step 200' are compared with certain predetermined criteria, according to some aspects of the embodiments of the present invention, by means of one of, or a combination of, the following:

Check the number of radar detections D for each radar cycle and compare this number to a detection number threshold $T_n$.

If N>1, check the number of radar cycles where a detected target object 12, 13, 14 is present. For example 65 times out of N=100 gives 65%, and this is compared to a second design threshold $T_{D2}$.

In a fourth step 400', the signal power level is reduced and the method repeated from the second step 200' until stored target data do not meet certain predetermined criteria according to the third step 300', according to some aspects of the embodiments of the present invention, corresponding to that the target no longer is distinguishable.

According to some aspects of embodiments of the present invention, as in the first example, signal level reduction can be done by one or a combination of the following:

Reduction of transmit power.

Reduction of receive gain.

Reduction of fast Fourier transform (FFT) bits or analog to digital converter (ADC) bit shift.

Use a digital variable gain.

Any other method to change the transmitted or received signal.

According to some aspects of embodiments of the present invention, the radar transceiver 3 comprises Monolithic Microwave Integrated Circuit (MMIC) technology, where the reduction of transmit power and/or receive gain is performed by controlling the relevant MMIC.

The cumulated amount of signal power level reduction, a total signal power level reduction L, is stored.

In a fifth step 500', the total signal power level reduction L at which the stored target data do not meet the certain predetermined criteria according to the third step 300', is compared to a second level threshold $T_{L2}$. The second level threshold $T_{L2}$ can for example be a fixed value, determined based on design and validation.

In a sixth step 600', if the total signal power level reduction L falls below the second level threshold $T_{L2}$, it is determined that the result is not acceptable, for example the bumper repaint is not acceptable.

In a seventh step 700', if the total signal power level reduction L exceeds the second level threshold $T_{L2}$, it is determined that the result is acceptable, for example the bumper repaint is acceptable.

If the total signal power level reduction L equals the first second threshold $T_{L2}$, this could either be communicated separately, or any one of the sixth step 600' or seventh step 700' be taken.

According to some aspects of embodiments of the present invention, for the second step 200', the data can be filtered. For example only the radar detections classified as stationary are used and/or the radar detections that have a quality bit set, and/or the radar detections that appear at a certain range to reduce multipath problem.

According to some aspects of embodiments of the present invention, for the second step, several angular zones in azimuth can be provided. For example, a first zone 15 in the azimuth angular interval −70° to −25°, a second zone 16 in the azimuth angular interval −25° to 0°, a third zone 17 in the azimuth angular interval 0° to 25° and a fourth zone 18 in the azimuth angular interval 25° to 70°. This can provide separate information regarding the different zones 15, 16, 17, 18.

According to some aspects of embodiments of the present invention, when doing tests in an open space, it is possible to add objects that will become targets at random places. Such objects could be corner reflectors, or just a tool box for example. Metallic objects are of course preferred.

According to some aspects of embodiments of the present invention, the fifth step 500' can be used as a calibration procedure at a factory or during dealer checks. Here, the second level threshold $T_{L2}$ can be set by design, or be derived from a calibration value. For example:

The test is performed before shipping the vehicle 1. This test can also be performed at each check at a dealer. This would help to keep track of degradation due to aging.

The required results of the third step 300' and total reduction amount L can be saved as reference.

When repair paint is tested, the resulting values can be used for comparison to provide bumper attenuation as a radome.

The bumper attenuation can be compared to a fixed attenuation threshold $T_A$.

According to some aspects of embodiments of the present invention, this test is performed before IG-OFF (ignition off). The required amount of attenuation is saved before IG-OFF. At IG-ON (ignition on), the same test is performed and the difference in attenuation is checked. This can be used at repair, and also for many other blockage situations during the vehicle's life.

This means that it is possible to perform a check of what could happen to the bumper 8 (mud, scratch) while a driver is not in the vehicle 1. At IG-OFF, before turning off the ECU, the test procedure according to the above is run and the total signal power level reduction L can be stored. At the next IG-ON, the test procedure according to the above is run again, and a new value for the total signal power level reduction L is acquired and compared with the previous one. Since the vehicle has been stopped, it can be assumed that the environment conditions directly before and after the stop are very similar.

In the same way as for the first example, depending on the method used for signal level reduction in the fourth step 400', it might not be necessary to perform the second step again. If digital gain is used in the signal processing, the collected analog data are converted to digital data which are stored. When reprocessing the stored data, there is no need to get new digital data. This is indicated with a dashed arrow A in FIG. 5.

If the second step 200' is deemed necessary or not of course depends on the definition of the second step, and it can easily be appreciated by a skilled person within the present technical field that such variation is possible.

According to some aspects of embodiments of the present invention, the first example and the second example can be combined, such that there are both at least one predefined target object 7, 7', 7'' and at least one undefined target object 12, 13, 14 in the environment.

This present disclosure comprises searching for a threshold with a direct approach that lowers a signal power level. A general flow chart is shown in FIG. 6, where the steps 300, 400; 300' 400' that relate to the lowering process of the signal power level are generalized in one general signal search step 30 which comprises a search loop where a signal power level for which the previously mentioned predetermined criteria are not met is derived.

Figure 6:
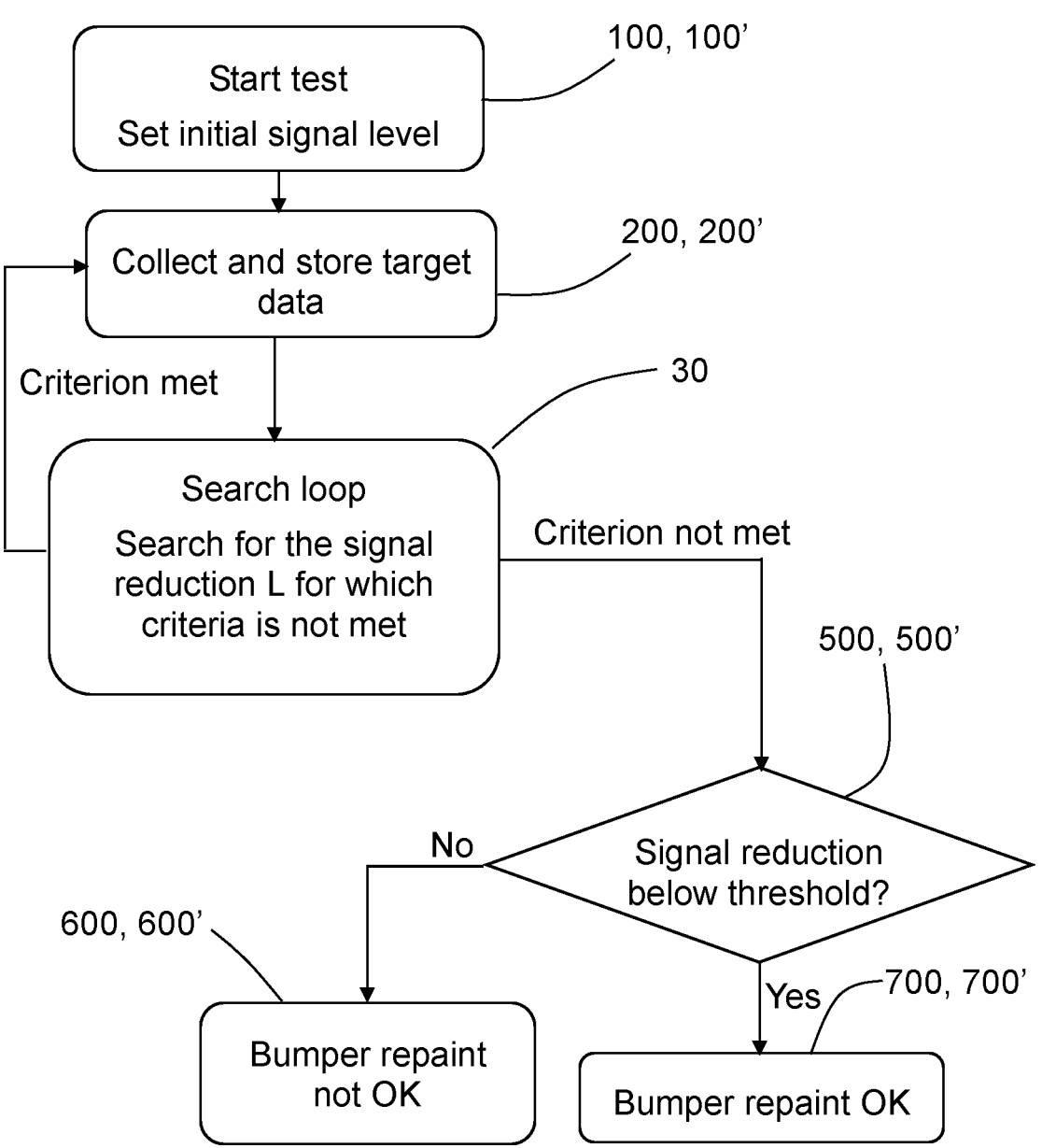
FIG. 6 is a flow chart illustrating methods according to a general example.

In other words, with reference to FIG. 6 that shows a general example, a search is performed for a total signal reduction level L compared to normal operation, for which total signal reduction level L predetermined criteria are not met. This is accomplished by collecting 200, 200' target data, and comparing the target data to a detection criteria and modifying the signal power level accordingly 30. This is repeated until the reduction L required is found, and then the total signal reduction level L is compared 500, 500' to a threshold. In dependence of the result of this comparison it is determined if the bumper repaint is acceptable or not 600, 600'; 700, 700'.

This search loop 30 can be formed in many ways, as the two linear examples described previously where a signal power level is decreased in steps. For the two examples as illustrated in FIG. 3 and FIG. 5, there is a first signal search step 30A which comprises a search loop where a signal power level for which the previously mentioned predetermined criteria are not met is derived.

Other algorithms can be used in the signal search step 30 to accomplish the desired result, according to some aspects of the embodiments of the present invention, binary search algorithms.

Figure 7:
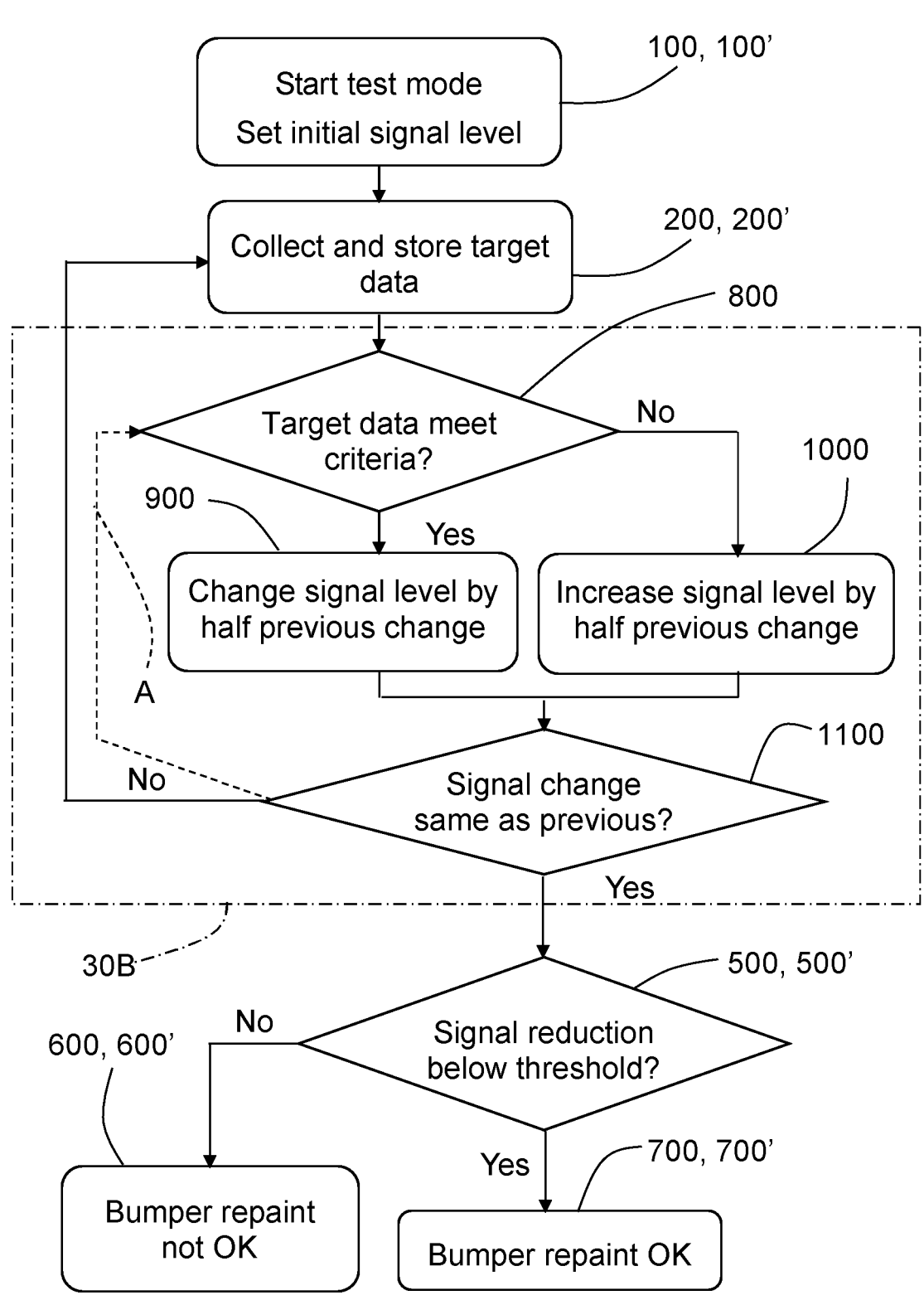
FIG. 7 is a flow chart illustrating methods according to a third example.

An example of a binary search algorithm for the signal search step 30 that is applicable for the concepts of the two previous examples is shown in FIG. 7 that shows a third example, where the two first steps 100, 100'; 200, 200' can be performed according to any one of the previous samples, where target data are collected and stored in a second step 200, 200'.

There is a common signal search step 30B that comprises:

Determining 800 if target data meet predetermined criteria. If this is the case, the signal power level is changed 900 by the half previous change, where a change can be either an increase or a reduction of signal power. If this is not the case, the signal power level is increased 1000 by the half previous change. For the first iteration, when there is no previous reduction, the reduction is half a maximum possible signal power level reduction.

The common signal search step 30B further comprises determining 1100 if the change of signal power level is the same as last time, i.e. if the search is converging. If that is not the case, the procedure is repeated from the second step 200, 200' otherwise the procedure continues with the fifth step 500, 500', sixth step 600, 600' and seventh step 700, 700' as in the previous examples.

As in the previous examples, it may not be necessary to repeat the procedure from the second step 200, 200' as indicated with a dashed arrow A. As mentioned above, the third example is applicable for the first example and the second example.

Figure 8:
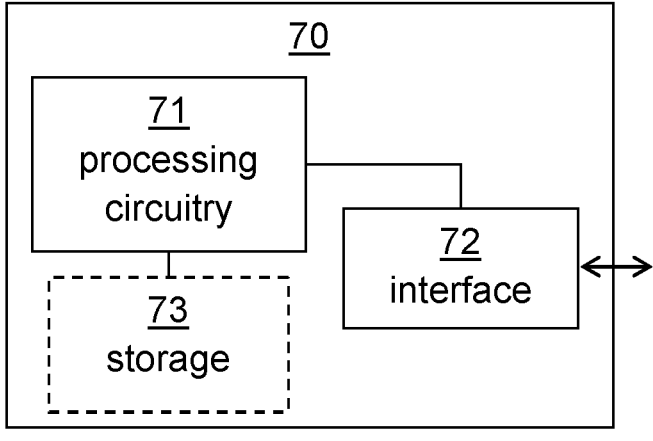
FIG. 8 schematically illustrates a control unit.

FIG. 8 schematically illustrates, in terms of a number of functional units, the components of a control unit 70, corresponding to the control unit 4 described, according to an embodiment. Processing circuitry 71 is provided using any combination of one or more of a suitable central processing unit (CPU), multiprocessor, microcontroller, digital signal processor (DSP), dedicated hardware accelerator, etc., capable of executing software instructions stored in a computer program product, e.g. in the form of a storage medium 73. The processing circuitry 71 may further be provided as at least one application specific integrated circuit (ASIC), or field programmable gate array (FPGA).

Particularly, the processing circuitry 71 is configured to cause the control unit 70 to perform a set of operations, or steps. These operations, or steps, were discussed above in connection to the various radar transceivers and methods. For example, the storage medium 73 may store the set of operations, and the processing circuitry 71 may be configured to retrieve the set of operations from the storage medium 73 to cause the control unit 70 to perform the set of operations. The set of operations may be provided as a set of executable instructions. Thus, the processing circuitry 71 is thereby arranged to execute methods and operations as herein disclosed.

The storage medium 73 may also comprise persistent storage, which, for example, can be any single one or combination of magnetic memory, optical memory, solid state memory or even remotely mounted memory.

The control unit 70 may further comprise a communications interface 72 for communications with at least one other unit. As such, the radar interface 72 may comprise one or more transmitters and receivers, comprising analogue and digital components and a suitable number of ports for wired or wireless communication.

The processing circuitry 71 is adapted to control the general operation of the control unit 70 e.g. by sending data and control signals to the external unit and the storage medium 73, by receiving data and reports from the external unit, and by retrieving data and instructions from the storage medium 73. Other components, as well as the related functionality, of the control unit 70 are omitted in order not to obscure the concepts presented herein.

Figure 9:
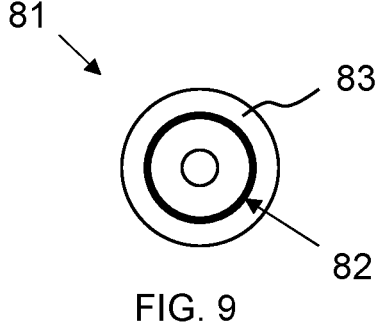
FIG. 9 shows an example computer program product.

FIG. 9 shows a computer program product 81 comprising computer executable instructions 82 arranged on a computer readable medium 83 to execute any of the methods disclosed herein.

Figure 10:
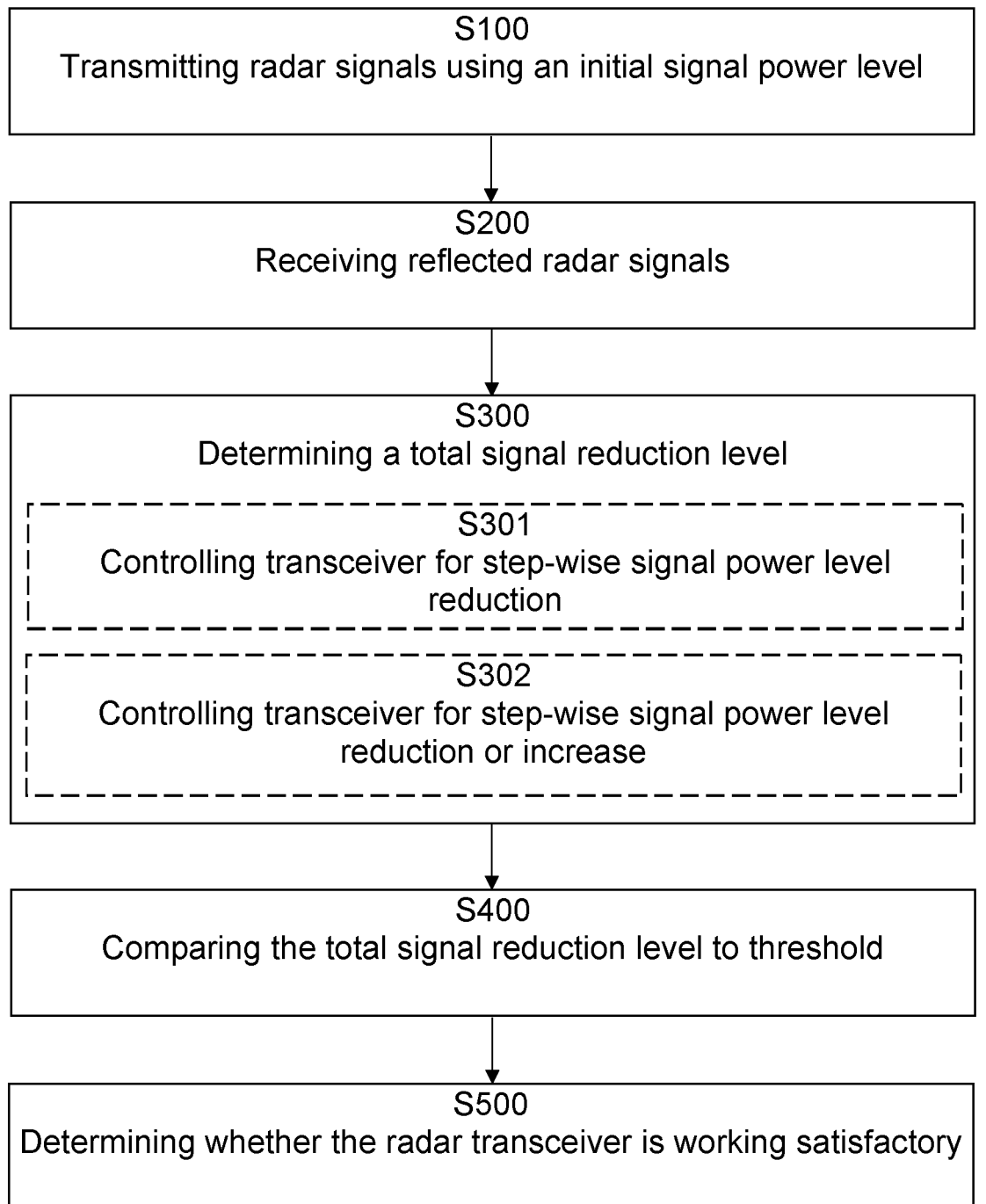
FIG. 10 is a flow chart illustrating methods.

With reference to FIG. 10, the present disclosure relates to a method for controlling the function of a vehicle radar transceiver 3. The method comprises transmitting S100 radar signals 5 using an initial signal power level $P_i$; and receiving S200 reflected radar signals 6 that have been reflected by an object 7. The method further comprises determining S300 a total signal reduction level L for which at least one predetermined criterion is not met, comparing S400 the total signal reduction level L to a threshold; and determining S500 whether the radar transceiver 3 is working in an acceptable manner or not in dependence of the comparison.

According to some aspects of embodiments of the present invention, the predetermined criterion relates to at least one of received signal quality and/or the number of detections corresponding to the received signal 6.

According to some aspects of embodiments of the present invention, the determining S300 of a total signal reduction level L comprises repeatedly controlling S301 the radar transceiver 3 to apply a step-wise reduction of signal power level until the total signal reduction level L for which at least one predetermined criterion is not met is obtained.

According to some aspects of embodiments of the present invention, the determining S300 of a total signal reduction level L comprises repeatedly controlling S302 the radar transceiver 3 to either step-wise reduce or step-wise increase the signal power level in dependence of a previous signal power level change or half a maximum possible reduction, until the total signal reduction level L for which at least one predetermined criterion is not met is obtained.

According to some aspects of embodiments of the present invention, at least one object is a predefined target object 7 associated with predefined target position data.

According to some aspects of embodiments of the present invention, there is a plurality of predefined target objects 7,

7', 7" positioned at different azimuth angles within a field of view, FOV, 9 of the radar transceiver 3.

The present disclosure is not limited to the examples discussed, but may vary freely whiting the scope of the appended claims. For example, the radar transceivers can be of any suitable kind, and can according to some aspects of the embodiments of the present invention, comprise suitable devices such as antennas, transmitters, receivers, control units etc.

The control unit 4, 70 may be constituted by one unit or by two or more distributed sub-units.

In this context, a detection corresponds to a received radar signal that has been reflected by an object 7. A plurality of such received radar signal corresponds to a plurality of detections. A plurality of detections can originate from one object or from two or more objects.

The test of the radar transceiver 3 can of course be performed to check its functions for many reasons, not only because of a re-painted bumper.

The present disclosure can be applied to any suitable radar transceiver or radar transceivers comprised in the radar system 2.

Generally, the present disclosure relates to a radar system 2 for a vehicle 1, comprising a radar transceiver 3 and a control unit 4. The control unit 4 is adapted to control the radar transceiver to apply an initial signal power level P$_i$ for transmitted radar signals 5, and to receive reflected radar signals 6 that have been reflected by at least one object 7. The control unit 4 is further adapted to determine a total signal reduction level L for which at least one predetermined criterion is not met, to compare the total signal reduction level L to a threshold; and to determine whether the radar transceiver 3 is working in an acceptable manner or not in dependence of the comparison.

According to some aspects of embodiments of the present invention, the predetermined criterion relates to at least one of received signal quality and/or the number of detections corresponding to the received signal 6.

According to some aspects of embodiments of the present invention, the control unit 4 is adapted to repeatedly control the radar transceiver to apply a step-wise reduction of signal power level until the total signal reduction level L for which at least one predetermined criterion is not met is obtained.

According to some aspects of embodiments of the present invention, the control unit 4 is adapted to either step-wise reduce or step-wise increase the signal power level in dependence of a previous signal power level change or half a maximum possible signal power level reduction, until the total signal reduction level L for which at least one predetermined criterion is not met is obtained.

According to some aspects of embodiments of the present invention, at least one object is a predefined target object 7 associated with predefined target position data.

According to some aspects of embodiments of the present invention, there is a plurality of predefined target objects 7, 7', 7" positioned at different azimuth angles within a field of view, FOV, 9 of the radar transceiver 3.

According to some aspects of embodiments of the present invention, at least one object is an undefined target object 12, 13, 14 in the environment.

According to some aspects of embodiments of the present invention, several angular zones 15, 16, 17, 18 are provided in azimuth such that separate information regarding the different zones 15, 16, 17, 18 can be obtained.

While the above description constitutes the preferred embodiment of the present invention, it will be appreciated that the invention is susceptible to modification, variation and change without departing from the proper scope and fair meaning of the accompanying claims.

The invention claimed is:

1. A radar system for a vehicle, comprising a radar transceiver and a control unit, where the control unit is adapted to control the radar transceiver to:

apply an initial signal power level for transmitted radar signals; and to receive reflected radar signals that have been reflected by at least one object;

wherein the control unit is further adapted to:

determine a total signal reduction level for which at least one predetermined criterion is not met by repeatedly controlling the radar transceiver to apply a step-wise reduction of signal power level until the total signal reduction level for which the at least one predetermined criterion is not met is reached;

compare the total signal reduction level to a threshold providing a comparison; and to determine whether the radar transceiver is working in an acceptable manner or not in dependence of the comparison, wherein the predetermined criterion relates to at least one of a quality of the received signals or the number of detections corresponding to the reflected signals which are received.

2. The radar system according to claim 1, wherein at least one object is a predefined target object associated with predefined target position data.

3. The radar system according to claim 2, wherein there is a plurality of the predefined target objects positioned at different azimuth angles within a field of view of the radar transceiver.

4. The radar system according to claim 1, wherein the at least one object is an undefined target object in the environment.

5. The radar system according to claim 4, wherein several angular zones are provided in azimuth such that separate information regarding individual of the several angular zones can be obtained.

6. A method for controlling the function of a vehicle radar transceiver, where the method comprises the steps of:

transmitting radar signals using an initial signal power level; and receiving reflected radar signals that have been reflected by an object, wherein the method further comprises:

determining a total signal reduction level for which at least one predetermined criterion is not met;

comparing the total signal reduction level to a threshold providing a comparison; and determining whether the radar transceiver is working in an acceptable manner or not in dependence of the comparison, wherein determining the total signal reduction level for which the at least one predetermined criterion is not met includes repeatedly controlling the radar transceiver to apply a step-wise reduction of signal power level until the total signal reduction level for which at least one predetermined criterion is not met is obtained, and wherein the predetermined criterion relates to at least one of received signal quality or the number of detections corresponding to the reflected radar signals which are received.

7. The method according claim 6, wherein the object is a predefined target object associated with predefined target position data.

\* \* \* \* \*